US012633603B2

(12) United States Patent
Park et al.

(10) Patent No.: US 12,633,603 B2
(45) Date of Patent: May 19, 2026

(54) CYLINDRICAL SECONDARY BATTERY INCLUDING GASKET HAVING RECESS FORMED THEREIN

(71) Applicant: LG Energy Solution, Ltd., Seoul (KR)

(72) Inventors: Min Hee Park, Daejeon (KR); Se Won Kim, Daejeon (KR); Hun Cha, Daejeon (KR); Jong Seung Na, Daejeon (KR); Sang Woo Kim, Daejeon (KR); Sang Jun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1186 days.

(21) Appl. No.: 17/530,770

(22) Filed: Nov. 19, 2021

(65) Prior Publication Data

US 2022/0077526 A1      Mar. 10, 2022

Related U.S. Application Data

(63) Continuation-in-part of application No. PCT/KR2020/006498, filed on May 18, 2020.

(30) Foreign Application Priority Data

Jun. 18, 2019    (KR) ........................ 10-2019-0072473

(51) Int. Cl.
*H01M 50/152*       (2021.01)
*H01M 50/107*       (2021.01)
(Continued)

(52) U.S. Cl.
CPC ....... *H01M 50/152* (2021.01); *H01M 50/107* (2021.01); *H01M 50/171* (2021.01); *H01M 50/578* (2021.01)

(58) Field of Classification Search
CPC ............ H01M 50/152; H01M 50/107; H01M 50/578; H01M 50/171
See application file for complete search history.

(56) References Cited

U.S. PATENT DOCUMENTS

2006/0093904 A1    5/2006    Cheon et al.
2007/0015046 A1*   1/2007    Kim .................... H01M 50/171
                                                                429/185
(Continued)

FOREIGN PATENT DOCUMENTS

CN        101651229 A     2/2010
CN        103650199 A     3/2014
(Continued)

OTHER PUBLICATIONS

EPO machine generated English translation of JP-2009283209-A (Year: 2009).*

(Continued)

*Primary Examiner* — Kimberly Wyluda
(74) *Attorney, Agent, or Firm* — Lerner David LLP

(57)               ABSTRACT

A cylindrical secondary battery includes a first gasket and a second gasket having a modified shape to secure hermetic sealability and insulation. The battery includes a cylindrical can for receiving an electrode assembly, a cap assembly located at the upper part of the cylindrical can, a first gasket for covering outer circumferential edges of a top cap and a venting member of the cap assembly, a current interrupt device (CID) located at the lower part of the cap assembly, and a second gasket along the outer circumferential edge of the current interrupt device. An upper end portion of the first gasket covers the upper surface of the outer circumferential edge of the top cap, and includes a recessed portion in its inner surface configured to prevent the first gasket from (Continued)

being brought into tight contact with the upper surface of the outer circumferential edge of the top cap.

15 Claims, 7 Drawing Sheets

(51) Int. Cl.
  H01M 50/171 (2021.01)
  H01M 50/578 (2021.01)

(56) References Cited

U.S. PATENT DOCUMENTS

| | | | |
|---|---|---|---|
| 2009/0214948 A1 | 8/2009 | Cheon | |
| 2010/0040943 A1 | 2/2010 | Kim | |
| 2011/0076527 A1 | 3/2011 | Kim et al. | |
| 2012/0028090 A1 | 2/2012 | Kyung-Su et al. | |
| 2012/0100404 A1* | 4/2012 | Lee | H01M 50/171 |
| | | | 429/82 |
| 2013/0273401 A1 | 10/2013 | Lee et al. | |
| 2015/0236334 A1* | 8/2015 | Lee | H01M 50/147 |
| | | | 429/82 |
| 2018/0097215 A1 | 4/2018 | Cho et al. | |
| 2018/0159100 A1 | 6/2018 | Lee et al. | |
| 2018/0205044 A1 | 7/2018 | Urushihara | |
| 2019/0386272 A1 | 12/2019 | Shin et al. | |
| 2020/0358048 A1 | 11/2020 | Kim et al. | |

FOREIGN PATENT DOCUMENTS

| | | | |
|---|---|---|---|
| CN | 206003849 U | 3/2017 | |
| CN | 107437593 A | 12/2017 | |
| CN | 107667443 A | 2/2018 | |
| EP | 2472634 A1 | 7/2012 | |
| EP | 2733767 A2 | 5/2014 | |
| EP | 3584853 A1 | 12/2019 | |
| JP | S5256225 U | 4/1977 | |
| JP | S53166023 U | 12/1978 | |
| JP | H11283588 A | 10/1999 | |
| JP | 2004-186117 A | 7/2004 | |
| JP | 2006128121 A | 5/2006 | |
| JP | 2009135008 A | 6/2009 | |
| JP | 2009283209 A | * 12/2009 | |
| JP | 2010124072 A | 6/2010 | |
| JP | 2014524118 A | 9/2014 | |
| KR | 20000051436 A | 8/2000 | |
| KR | 200363824 Y1 | 10/2004 | |
| KR | 20130009691 A | 1/2013 | |
| KR | 101313325 B1 | 9/2013 | |
| KR | 20160012955 A | 2/2016 | |
| KR | 20170063128 A | 6/2017 | |
| KR | 20180036086 A | 4/2018 | |
| KR | 20190040698 A | 4/2019 | |
| WO | 8911608 A1 | 11/1989 | |
| WO | 2011-040692 A1 | 4/2011 | |
| WO | 2014017091 A1 | 1/2014 | |
| WO | 2019054765 A1 | 3/2019 | |

OTHER PUBLICATIONS

Extended European Search Report including Written Opinion for Application No. 20825967.1 dated Apr. 4, 2022, pp. 1-6.
International Search Report for Application No. PCT/KR2020/006498 mailed Aug. 26, 2020, 3 Pages.

* cited by examiner

【FIG. 1】
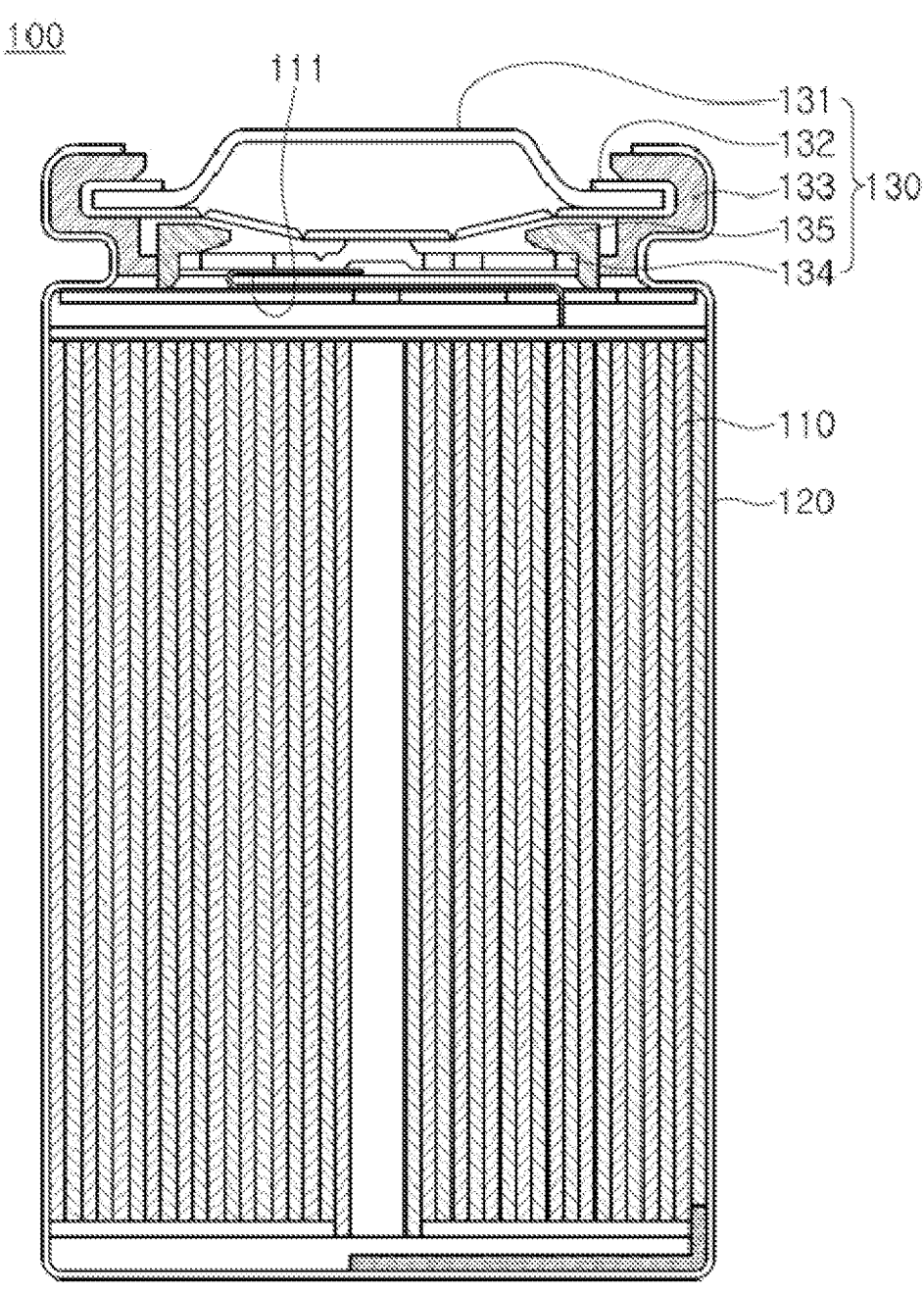

【FIG. 2】
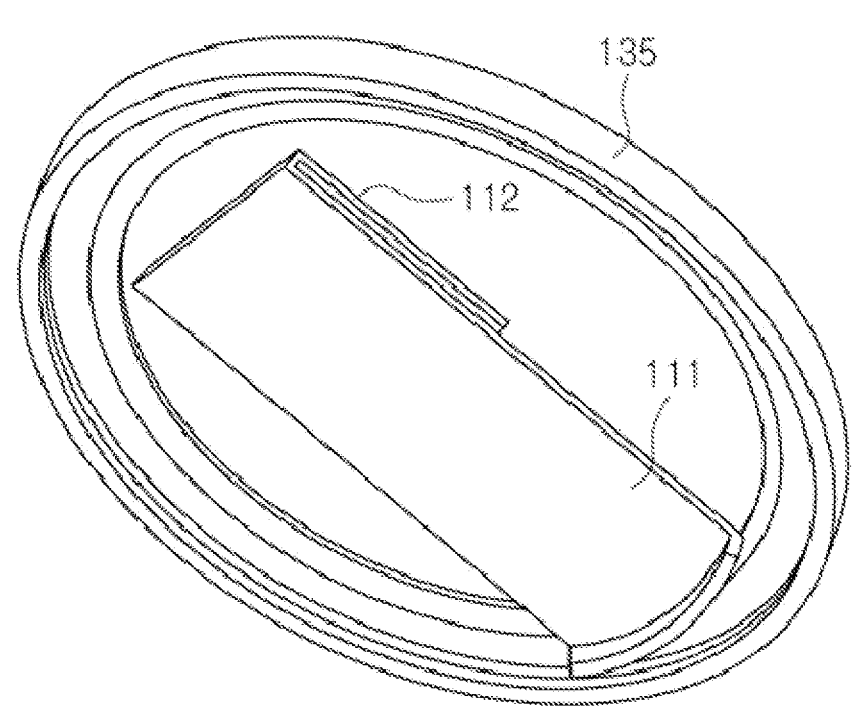

【FIG. 3】
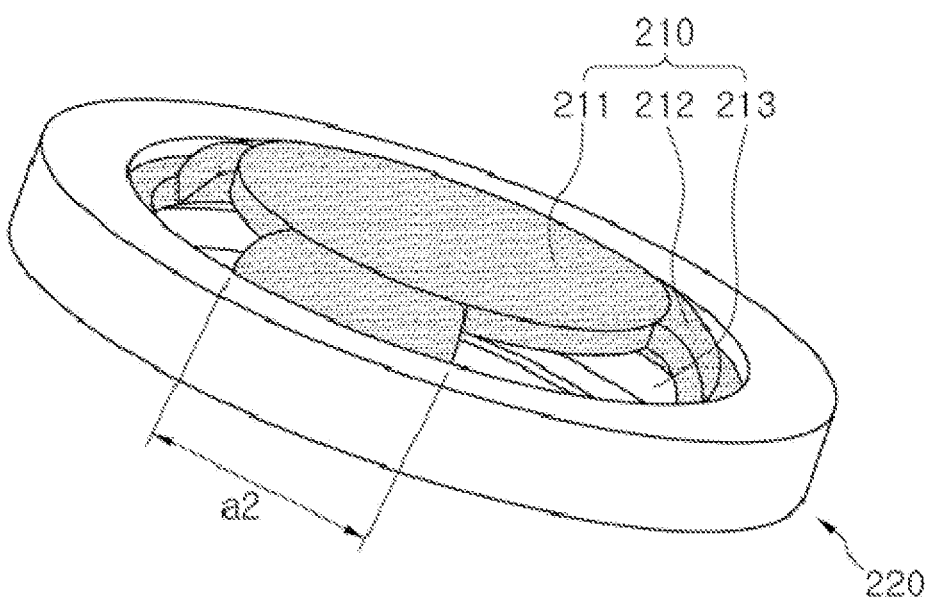

【FIG. 4】
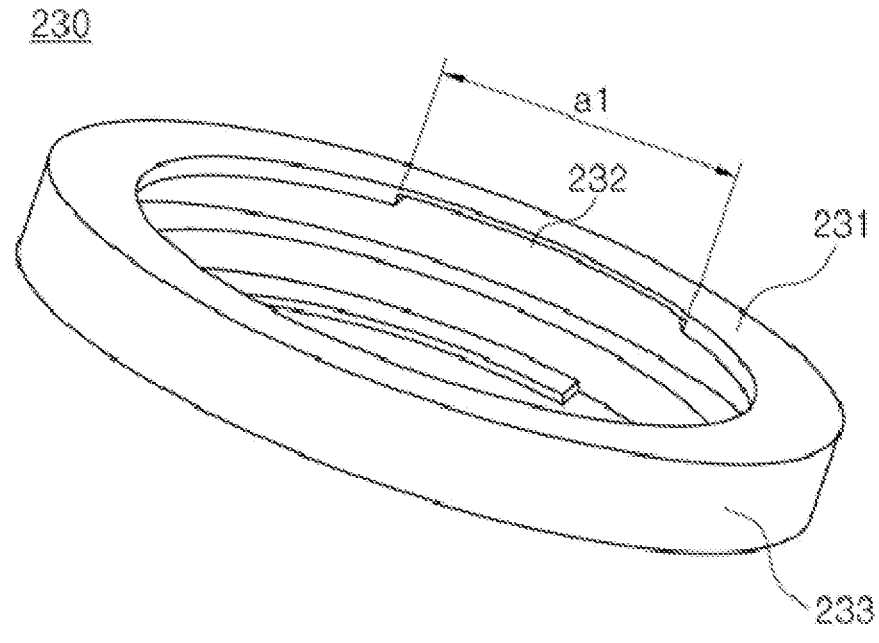

【FIG. 5】
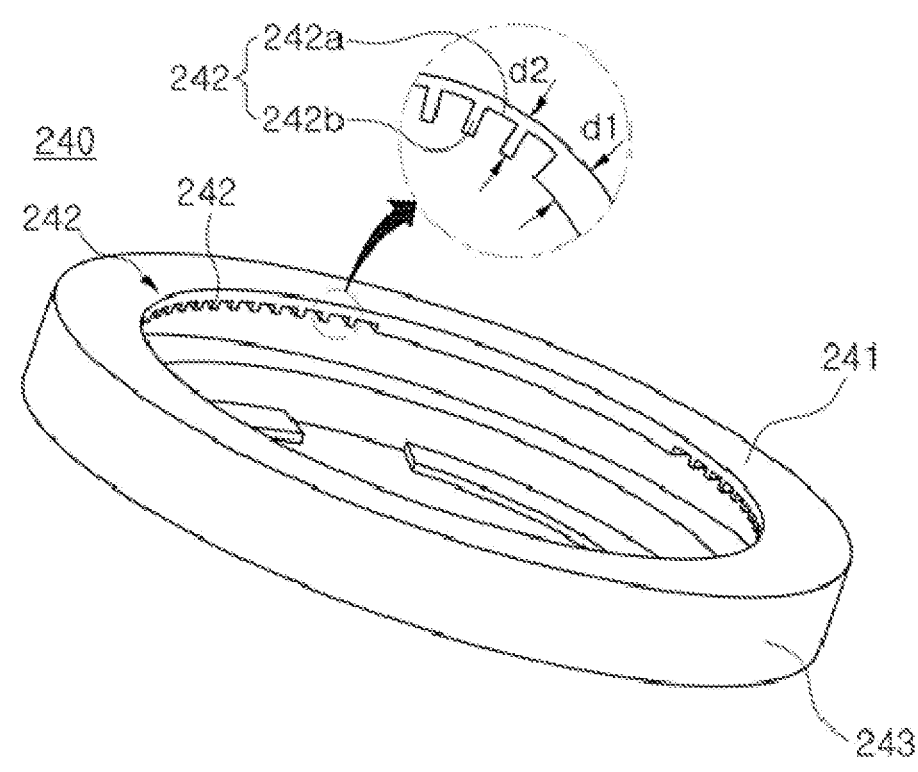

【FIG. 6】
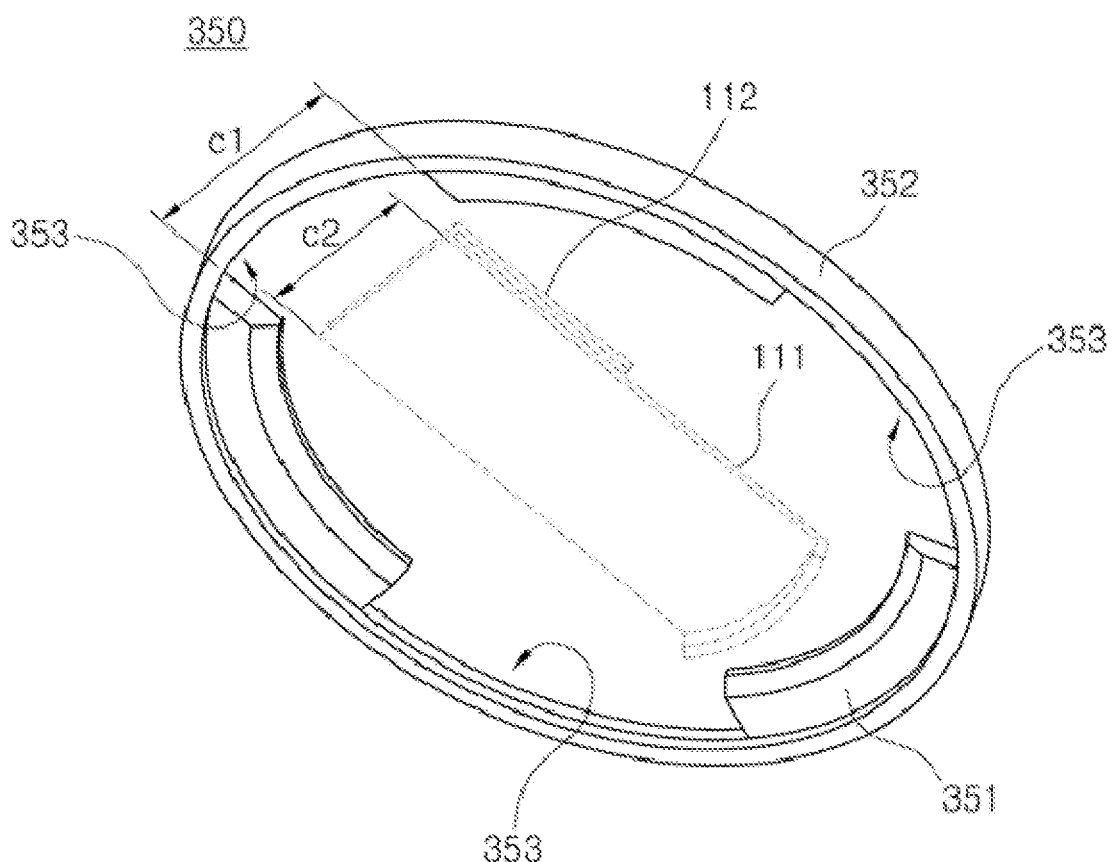

【FIG. 7】
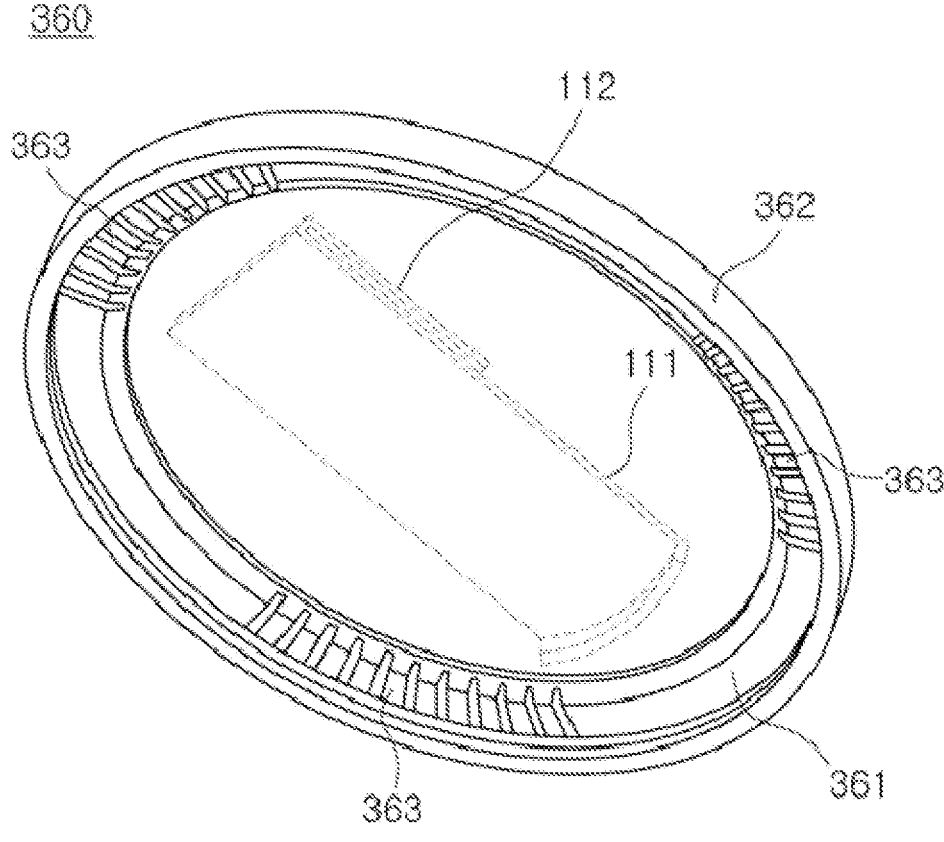

CYLINDRICAL SECONDARY BATTERY INCLUDING GASKET HAVING RECESS FORMED THEREIN

CROSS-REFERENCE TO RELATED APPLICATIONS

This application is a continuation-in-part of International Application No. PCT/KR2020/006498 filed on May 18, 2020, which claims priority to Korean Patent Application No. 10-2019-0072473 filed on Jun. 18, 2019, the disclosures of which are hereby incorporated by reference herein their entirety.

TECHNICAL FIELD

The present invention relates to a cylindrical secondary battery including a gasket having a recess formed therein, and more particularly to a cylindrical secondary battery including a gasket having a recess formed therein, wherein the shape of a gasket adjacent to a high-temperature portion of a cap assembly is modified, whereby resistance of the cylindrical secondary battery to high temperature is improved.

BACKGROUND ART

Lithium secondary batteries are classified into a cylindrical secondary battery having an electrode assembly mounted in a cylindrical metal can, a prismatic secondary battery having an electrode assembly mounted in a prismatic metal can, and a pouch-shaped secondary battery having an electrode assembly mounted in a pouch-shaped case made of an aluminum laminate sheet. Among these batteries, the cylindrical secondary battery has advantages in that the capacity of the cylindrical secondary battery is relatively large and in that the cylindrical secondary battery is structurally stable.

The cylindrical secondary battery is configured such that a cap assembly is located at the upper end of a cylindrical case, which is open, and the cylindrical secondary battery is hermetically sealed in the state in which a gasket is interposed between the cylindrical case and the cap assembly.

FIG. 1 is a vertical sectional view of a general cylindrical secondary battery. Referring to FIG. 1, the cylindrical secondary battery 100 is configured such that a jelly-roll type electrode assembly 110 is received in a cylindrical battery case 120, a cap assembly 130 is located at the upper part of the cylindrical battery case 120, and the cylindrical secondary battery 100 is hermetically sealed by a first gasket 133 of the cap assembly 130.

The cap assembly 130 includes a safety vent 132 located at the lower part of the top cap 131 in the state of covering the outer circumference of the top cap and a current interrupt device 134 located under the safety vent 132 in the state of being in contact with the central part of the safety vent 132. A second gasket 135, configured to prevent the safety vent 132 and the current interrupt device 134 from contacting each other at parts other than the central part of the safety vent 132, is located at the outer circumferential edge of the current interrupt device 134.

A positive electrode tab 111 of the jelly-roll type electrode assembly 110 is attached to the lower surface of the current interrupt device 134 such that the cap assembly 130 functions as a positive electrode terminal.

In connection therewith, the part of the top cap 131 at which no gas discharge opening is formed may overheat due to the generation of heat from the positive electrode tab, and there is a high possibility that the part of the first gasket that is in tight contact with the heat generation portion of the top cap will melt. In the case in which the first gasket melts, a problem in that hermetic sealing of the secondary battery is deteriorated or a problem in that electrical conduction is caused due to contact between the battery case and the tap assembly may occur.

FIG. 2 is a lower perspective view showing the positional relationship between the second gasket and the positive electrode tab of FIG. 1.

Referring to FIG. 2, the positive electrode tab 111, which is attached to the jelly-roll type electrode assembly and extends therefrom, is coupled to the current interrupt device (not shown). In the case in which the end 112 of the positive electrode tab 111 is bent in order to stably couple the positive electrode tab to the current interrupt device, the end 112 of the positive electrode tab 111 may be coupled to the lower surface of the current interrupt device. That is, the positive electrode tab is not coupled to the central part of the lower surface of the current interrupt device but is coupled to the lower surface of the current interrupt device in the state of being biased to one side. The part of the second gasket 135 that is adjacent to the end 112 of the positive electrode tab may melt due to the temperature of the positive electrode tab, which is the main heat generation portion. In this case, the current interrupt device 134 and the safety vent 132 may be electrically conducted to each other.

Accordingly, each of the first gasket and the second gasket may be made of a material that has a high melting point, which, however, causes an increase in manufacturing costs and thus is difficult to apply.

Patent Document 1 relates to a hermetically sealed battery including an inner gasket having convex portions formed on opposite surfaces thereof, wherein it is possible to inhibit an electrolytic solution from permeating a hermetically sealed body, whereby it is possible to prevent malfunction of a PTC element or an explosion-proof valve in the hermetically sealed body. However, Patent Document 1 does not disclose technology capable of preventing a gasket from melting due to the generation of heat from a cap assembly.

Patent Document 2 discloses a structure in which a gasket having a recess formed therein is inserted between a cap assembly used as a positive electrode terminal and a can used as a negative electrode terminal in order to insulate the cap assembly and the can from each other. However, Patent Document 2 does not disclose a structure capable of preventing melting of a gasket for current interrupt devices.

Patent Document 3 discloses a structure in which a recess is formed in a gasket interposed between a cap assembly and a battery can in a direction toward the battery can, which, however, does not correspond to technology capable of preventing the gasket from being melted by a heated top cap.

Patent Document 4 discloses a cylindrical battery cell configured to have a structure in which a recessed groove is formed in the inner surface of a clamped portion of a metal can, which is the upper part of the metal can, with a gasket partially being introduced into the groove by clamping, whereby damage to the gasket is prevented during a clamping process.

As described above, no solution to prevent damage to a gasket due to high temperature in a cylindrical secondary battery has been proposed, and therefore there is a high necessity for technology capable of preventing melting of the gasket using an easy method, whereby it is possible to improve hermetic sealability and insulation.

PRIOR ART DOCUMENTS (Patent Document 1) Japanese Patent Application Publication No. 1999-283588 (1999.10.15)

(Patent Document 2) Korean Patent Application Publica-
tion No. 2000-0051436 (2000.08.16)
(Patent Document 3) Japanese Patent Application Publi-
cation No. 2009-135008 (2009.06.18)
(Patent Document 4) Korean Patent Application Publica-
tion No. 2018-0036086 (2018.04.09)

DISCLOSURE

Technical Problem

The present invention has been made in view of the above
problems, and it is an object of the present invention to
provide a cylindrical secondary battery including a gasket
having a recessed portion formed therein, wherein the cylin-
drical secondary battery is configured to have a structure in
which the shape of a first gasket interposed between a top
cap and a battery case is modified to minimize contact
between a high-temperature portion of the top cap and the
first gasket and in which the shape of a second gasket located
at the outer circumference of a current interrupt device is
modified to maximally maintain the distance between a
high-temperature positive electrode tab and the second gas-
ket.

Technical Solution

In order to accomplish the above object, the present
invention provides a cylindrical secondary battery including
a cylindrical can configured to receive an electrode assembly
including a positive electrode, a negative electrode, and a
separator; a cap assembly located at the upper part of the
cylindrical can; a first gasket configured to hermetically seal
the cylindrical can in the state of covering outer circumfer-
ential edges of a top cap and a venting member of the cap
assembly; a current interrupt device (CID) located at the
lower part of the cap assembly; and a second gasket located
at the outer circumferential edge of the current interrupt
device, wherein an upper end portion of the first gasket has
a structure configured to cover the upper surface of the outer
circumferential edge of the top cap, and a recessed portion
is formed in at least a part of the inner surface of the upper
end portion of the first gasket, the recessed portion being
configured to prevent the first gasket from being brought
into tight contact with the upper surface of the outer cir-
cumferential edge of the top cap.

The top cap may include a bridge configured to connect
a protruding central portion and the outer circumferential
edge of the top cap to each other, and the recessed portion
may be formed in the upper end portion of the first gasket
that faces the outer circumferential edge of the top cap
connected to the bridge.

The connection length between opposite ends of the
recessed portion may be greater than the width of the bridge.

The recessed portion may be provided with a recess
having an entirely uniform depth.

The recessed portion may have a structure in which
concave portions and convex portions are alternately
formed.

The thickness of each of the convex portions may be equal
to the thickness of the upper end portion of the first gasket
at which no recessed portion is formed.

The thickness of each of the convex portions may be less
than the thickness of the upper end portion of the first gasket
at which no recessed portion is formed.

The upper end portion of the first gasket may have a
porous structure.

The second gasket may include an upper portion located
at the upper surface of the outer circumferential portion of
the current interrupt device, the upper portion being config-
ured to prevent contact between the venting member and the
current interrupt device, and a side portion located outside
the outer circumferential portion of the current interrupt
device, and a punched portion may be formed in at least a
part of the upper portion.

The punched portion may be formed at a position adjacent
to a positive electrode tab coupled to the current interrupt
device.

The punched portion may be formed in a shape in which
a part of the inside of the upper second gasket portion is
removed.

The punched portion may have a structure in which a
recess is formed in the lower surface of the upper second
gasket portion.

The recess may be formed in a slit shape.

DESCRIPTION OF DRAWINGS

FIG. 1 is a vertical sectional view of a general cylindrical
secondary battery.

FIG. 2 is a lower perspective view showing the positional
relationship between a second gasket and a positive elec-
trode tab of FIG. 1.

FIG. 3 is a perspective view of a cap assembly.

FIG. 4 is a perspective view showing a first embodiment
of a first gasket.

FIG. 5 is a perspective view showing a second embodi-
ment of the first gasket.

FIG. 6 is a perspective view showing a first embodiment
of a second gasket.

FIG. 7 is a perspective view showing a second embodi-
ment of the second gasket.

BEST MODE

Now, preferred embodiments of the present invention will
be described in detail with reference to the accompanying
drawings such that the preferred embodiments of the present
invention can be easily implemented by a person having
ordinary skill in the art to which the present invention
pertains. In describing the principle of operation of the
preferred embodiments of the present invention in detail,
however, a detailed description of known functions and
configurations incorporated herein will be omitted when the
same may obscure the subject matter of the present inven-
tion.

In addition, the same reference numbers will be used
throughout the drawings to refer to parts that perform similar
functions or operations. In the case in which one part is said
to be connected to another part in the specification, not only
may the one part be directly connected to the other part, but
also, the one part may be indirectly connected to the other
part via a further part. In addition, that a certain element is
included does not mean that other elements are excluded, but
means that such elements may be further included unless
mentioned otherwise.

Embodiments of the present invention will be described in
detail with reference to the accompanying drawings.

FIG. 3 is a perspective view of a cap assembly.

Referring to FIG. 3, the cap assembly is configured to
have a structure in which the outer circumferential edge of
a top cap 210 is covered by a first gasket 220. The top cap
210 includes a protruding central portion 211, an opening
213 configured to allow gas generated in a cylindrical can to be discharged therethrough, and a bridge 212 configured to connect the central portion 211 and the outer circumferential edge of the top cap.

A positive electrode tab is coupled to the lower surface of a current interrupt device located at the lower end of the cap assembly. The positive electrode tab is a passage through which current flows, which is particularly a part from which heat is excessively generated.

As a result, the temperature of the entirety of the cap assembly connected to the positive electrode tab increases. Particularly, in the first gasket 220, the upper end portion of the first gasket 220 that faces the outer circumferential edge of the top cap connected to the bridge 212 of the top cap exhibits highest temperature distribution.

Accordingly, the present invention proposes a structure capable of minimizing contact between the outer circumferential edge of the top cap and the first gasket to inhibit high temperature of the bridge from being transmitted to the first gasket, thereby preventing melting of the first gasket.

In connection therewith, FIG. 4 is a view showing a first embodiment of the first gasket, and FIG. 5 is a view showing a second embodiment of the first gasket.

Referring to FIG. 4, a first gasket 230 has a structure in which a recessed portion 232 is formed in the inner surface of the upper end portion 231 of the first gasket.

Specifically, the recessed portion 232 is formed in the upper end portion 231 of the first gasket that faces the outer circumferential edge of the top cap connected to the bridge 212 of the top cap.

At the upper end portion of the first gasket, the recessed portion 232 may be formed so as to have a uniform thickness, and the same number of recessed portions 232 as the number of bridges formed on the top cap may be formed.

At the upper end portion of the first gasket, the thickness of the recessed portion 232 is less than the thickness of the part of the first gasket at which no recessed portion is formed, whereby a space spaced apart from the upper surface of the top cap is formed by the recessed portion 232 of the first gasket.

Preferably, the size of the recessed portion 232 is greater than the size of the outer circumferential edge of the top cap connected to the bridge, wherein the connection length a1 between opposite ends of the recessed portion 232 of the gasket 230 may be greater than the width a2 of the bridge 212 of FIG. 3.

Referring to FIG. 5, a first gasket 240 has a structure in which a recessed portion 242 is formed in the inner surface of the upper end portion 241 of the first gasket.

Like the first gasket 230 of FIG. 4, the recessed portion 242 of the first gasket 240 is formed in the inner surface of the upper end portion of the first gasket that faces the outer circumferential edge of the top cap connected to the bridge 212 of the top cap.

The recessed portion 242 has a structure in which concave portions 242a and convex portions 242b are alternately formed. In the case in which the thickness d2 of each of the convex portions 242b is equal to the thickness d1 of the upper end portion of the first gasket at which no recessed portion is formed, the concave portions 242a of the recessed portion are not brought into tight contact with the upper surface of the outer circumferential edge of the top cap connected to the bridge, but the convex portions 242b of the recessed portion are brought into tight contact with the upper surface of the outer circumferential edge of the top cap connected to the bridge.

As described above, the contact point between the high-temperature portion of the cap assembly and the first gasket may be partially removed, whereby it is possible to inhibit damage to the first gasket due to high temperature transmitted to the first gasket.

Alternatively, in the case in which the thickness d2 of each of the convex portions 242b is less than the thickness d1 of the upper end portion of the first gasket at which no recessed portion is formed, the entirety of the recessed portion is configured to be spaced apart from the upper surface of the outer circumferential edge of the top cap connected to the bridge, whereby it is possible to minimize high temperature from being transmitted to the first gasket.

Alternatively, the upper end portion 231 or 241 of the first gasket 230 or 240 may have a porous structure in order to minimize high temperature from being transmitted to the first gasket, and the side portion 233 or 243 of the first gasket 230 or 240 may have a high-density structure in order to hermetically seal the cylindrical can.

In general, the second gasket is located at the outer circumferential edge of the current interrupt device located at the lower part of the cap assembly, and the second gasket functions to maintain insulation between the current interrupt device and the safety vent when the current interrupt device and the safety vent are separated from each other.

The positive electrode tab of the electrode assembly is attached to the lower surface of the current interrupt device, and the positive electrode tab is attached to a position being biased from the center to one side of the current interrupt device. Consequently, the part of the second gasket that is adjacent to the positive electrode tab exhibits highest temperature distribution.

In connection therewith, FIG. 6 is a view showing a first embodiment of the second gasket, and FIG. 7 is a view showing a second embodiment of the second gasket.

Referring to FIG. 6, a second gasket 350 includes an upper second gasket portion 351 located at the upper surface of the outer circumferential portion of the current interrupt device in order to prevent contact between a venting member and the current interrupt device and a side second gasket portion 352 located outside the outer circumferential portion of the current interrupt device, wherein a punched portion 353 is formed in at least a part of the upper second gasket portion 351.

In FIG. 6, the positive electrode tab 111 that has been extended so as to be attached to the lower surface of the current interrupt device is shown by a dotted line. At a position adjacent to the end 112 of the positive electrode tab that is coupled to the current interrupt device, a part of the inside of the upper second gasket portion 351 is removed by punching, whereby the punched portion 353 is formed.

Preferably, the punched portion 353 is formed so as to have a size necessary to secure the distance from the positive electrode tab 111 and to be located at a position necessary to secure the distance from the positive electrode tab 111. Preferably, the connection length c1 between opposite ends of the punched portion is greater than the width c2 of the positive electrode tab.

Consequently, it is possible to maximize the distance between the end 112 of the positive electrode tab 111 and the second gasket 350.

Referring to FIG. 7, a second gasket 360 includes an upper second gasket portion 361 located at the upper surface of the outer circumferential portion of the current interrupt device in order to prevent contact between the venting member and the current interrupt device and a side second gasket portion 362 located outside the outer circumferential portion of the current interrupt device, wherein a punched portion 363 is formed in at least a part of the upper second gasket portion 361.

The punched portion 363 has a structure in which a plurality of recesses are formed within the lower surface of the upper second gasket portion 361 or in which a plurality of through holes are formed extending through the upper second gasket portion 361. As illustrated in FIG. 7, the punched portions 363 are each made up of a plurality of slit-shaped recesses or through holes extending side-by-side and oriented along the radial direction of the upper second gasket portion 361.

Consequently, in the case in which the safety vent is deformed due to an increase in inner pressure of the cylindrical secondary battery, whereby the safety vent coupled to the current interrupt device is separated from the current interrupt device, it is possible to inhibit damage to the second gasket due to high heat of the positive electrode tab transmitted to the second gasket while securing insulation between the safety vent and the current interrupt device.

In the same manner as the punched portion 353 of FIG. 6, the punched portion 363 is also formed in the upper part of the second gasket that is adjacent to the end 112 of the positive electrode tab, and the connection length between opposite ends of the punched portion is greater than the width of the positive electrode tab.

For reference, for each of the positive electrode tabs shown in FIGS. 6 and 7, the end of the positive electrode tab opposite to the end 112 of the positive electrode tab coupled to the current interrupt device is the portion that is connected to the electrode assembly, and is located so as to be spaced apart from the cap assembly. Unlike what is shown in the figures, therefore, the opposite end of the positive electrode tab is not located so as to be adjacent to the second gasket.

As described above, the present invention provides a cylindrical secondary battery configured such that a first gasket and a second gasket are applied in the state in which the shape of each of the first gasket and the second gasket is modified, whereby resistance of the cylindrical secondary battery to high temperature is improved while hermetic sealability and insulation of the cylindrical secondary battery are secured.

A person having ordinary skill in the art to which the present invention pertains will appreciate that various applications and modifications are possible based on the above description without departing from the scope of the present invention.

DESCRIPTION OF REFERENCE SYMBOLS

100: Cylindrical secondary battery
110: Jelly-roll type electrode assembly
111: Positive electrode tab
112: End of positive electrode tab
120: Cylindrical battery case
130: Cap assembly
131, 210: Top caps
132: Safety vent
133, 220, 230, 240: First gaskets
134: Current interrupt device
135, 350, 360: Second gaskets
211: Central portion
212: Bridge
213: Opening
231, 241: Upper end portions of first gaskets
232, 242: Recessed portions
233, 243: Side portions of first gaskets

242*a*: Concave portions
242*b*: Convex portions
351, 361: Upper second gasket portions
352, 362: Side second gasket portions
353, 363: Punched portions
a1: Connection length between opposite ends of recessed portion
a2: Width of bridge
c1: Connection length between opposite ends of punched portion
c2: Width of positive electrode tab
d1: Thickness of upper end portion of first gasket at which no recessed portion is formed
d2: Thickness of convex portion

INDUSTRIAL APPLICABILITY

As is apparent from the above description, a cylindrical secondary battery according to the present invention is configured such that a recessed portion is formed in a first gasket, whereby a portion is defined at which a top cap, which is a high-temperature portion, and the first gasket are not brought into tight contact with each other. Consequently, it is possible to minimize melting of the first gasket due to the generation of heat from the top cap.

In addition, a punched portion is formed in a second gasket, whereby it is possible to maximally maintain the distance between the second gasket and a positive electrode tab. Consequently, it is possible to minimize melting of the second gasket due to the generation of heat from the positive electrode tab.

As described above, it is possible to improve resistance of the cylindrical secondary battery to high temperature using a method of modifying the shape of each of the first gasket and the second gasket. Consequently, no additional process for securing resistance of the cylindrical secondary battery to high temperature is necessary, and therefore the present invention is easily applicable to a process of manufacturing a conventional cylindrical secondary battery.

In addition, no expensive heatproof material is used, whereby it is possible to reduce manufacturing costs.

The invention claimed is:

1. A cylindrical secondary battery comprising:
a cylindrical can configured to receive an electrode assembly comprising a positive electrode, a negative electrode, and a separator;
a cap assembly located at an upper part of the cylindrical can;
a first gasket configured to hermetically seal the cylindrical can, the first gasket having an annular shape covering an outer circumferential edges of a top cap and a venting member of the cap assembly;
a current interrupt device (CID) located at a lower part of the cap assembly; and
a second gasket located along an outer circumferential edge of the current interrupt device, wherein
an upper end portion of the first gasket is structured and arranged so as to cover an upper surface of the outer circumferential edge of the top cap, and
a recessed portion is located on an inner surface of the upper end portion of the first gasket facing the outer circumferential edge of the top cap, the recessed portion extending along a portion of the first gasket between a first terminal end and a second terminal end in a circumferential direction of the cylindrical secondary battery, the recessed portion preventing tight contact between the first gasket and the upper surface of the outer circumferential edge of the top cap at a location of the recessed portion, wherein the top cap comprises a bridge connecting a protruding central portion of the top cap to the outer circumferential edge of the top cap, and wherein the first terminal end and the second terminal end of the recessed portion of the first gasket are spaced apart from one another along the circumferential direction such that the recessed portion defined therebetween faces the outer circumferential edge of the top cap in a region of the outer circumferential edge that is aligned with the bridge.

2. The cylindrical secondary battery according to claim 1, wherein a connection length defined between the first terminal end and the second terminal end of the recessed portion along the circumferential direction of the cylindrical secondary battery is greater than a width of the bridge along the circumferential direction.

3. The cylindrical secondary battery according to claim 1, wherein the recessed portion includes a recess having an entirely uniform depth.

4. The cylindrical secondary battery according to claim 1, wherein the recessed portion includes a plurality of alternating concave portions and convex portions.

5. The cylindrical secondary battery according to claim 4, wherein a thickness of each of the convex portions is equal to a thickness of the upper end portion of the first gasket outside of the recessed portion.

6. The cylindrical secondary battery according to claim 4, wherein a thickness of each of the convex portions is less than a thickness of the upper end portion of the first gasket outside of the recessed portion.

7. The cylindrical secondary battery according to claim 1, wherein the upper end portion of the first gasket has a porous structure.

8. The cylindrical secondary battery according to claim 1, wherein the second gasket comprises: an upper portion located along an upper surface of the outer circumferential portion of the current interrupt device, the upper portion being arranged to prevent contact between the venting member and the current interrupt device; and a side portion located along a radially outer side of the outer circumferential portion of the current interrupt device, and the upper portion includes a punched portion defined by a circumferentially-extending region of reduced or eliminated material of the upper portion.

9. The cylindrical secondary battery according to claim 8, wherein the punched portion is located adjacent to a positive electrode tab coupled to the current interrupt device.

10. The cylindrical secondary battery according to claim 8, wherein the punched portion is defined by a plurality of through holes extending through and removing a part of the upper portion of the second gasket.

11. The cylindrical secondary battery according to claim 10, wherein each of the plurality of through holes has an elongated slit shape.

12. The cylindrical secondary battery according to claim 11, wherein the plurality of through holes extend side-by-side and the elongated slit shape of each of the plurality of through holes is oriented along a radial direction of the upper portion of the second gasket.

13. The cylindrical secondary battery according to claim 8, wherein the punched portion is defined by a plurality of recesses in a lower surface of the upper portion of the second gasket.

14. The cylindrical secondary battery according to claim 13, wherein each of the plurality of recesses has an elongated slit shape.

15. The cylindrical secondary battery according to claim 14, wherein the plurality of recesses extend side-by-side and the elongated slit shape of each of the plurality of recesses is oriented along a radial direction of the upper portion of the second gasket.

* * * * *